Oct. 11, 1960 A. F. SMITH 2,955,990
DISTILLING APPARATUS AND METHOD
Filed March 15, 1956 6 Sheets-Sheet 3

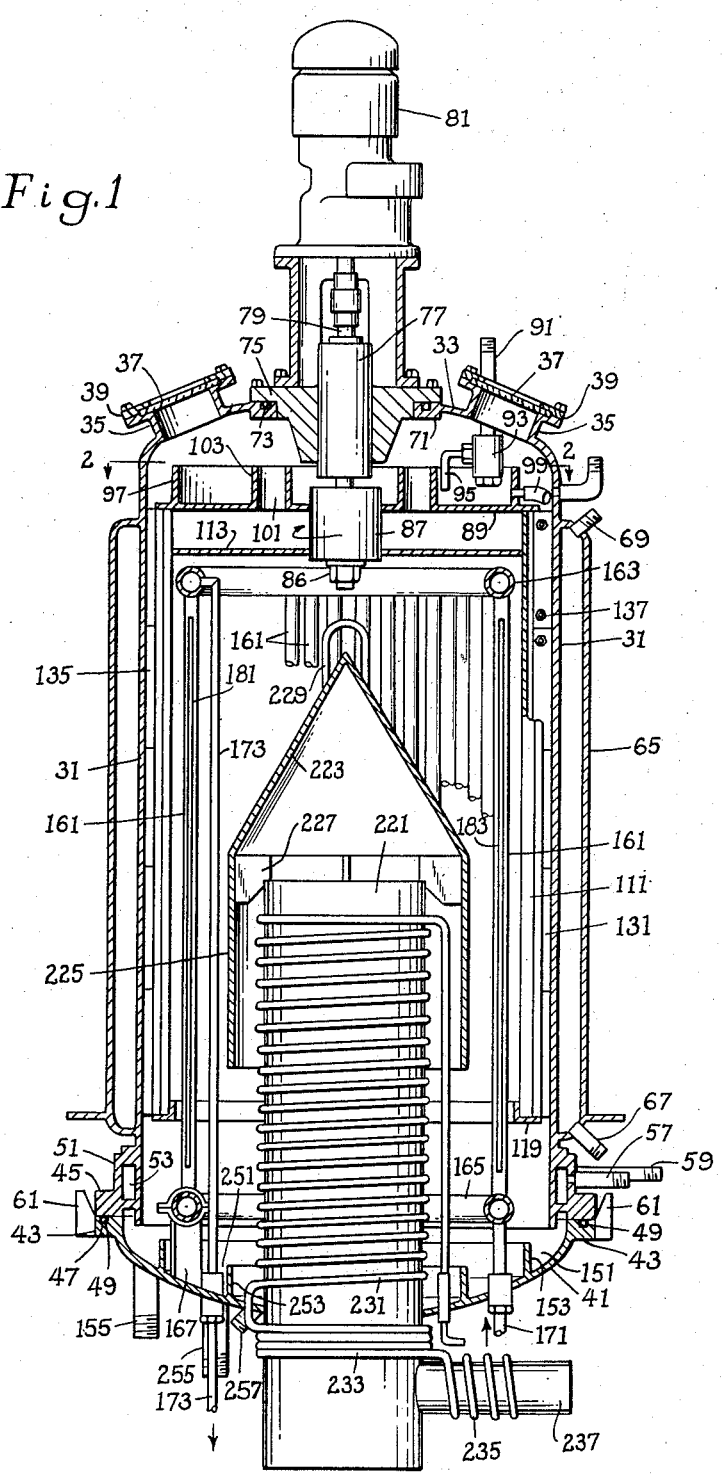

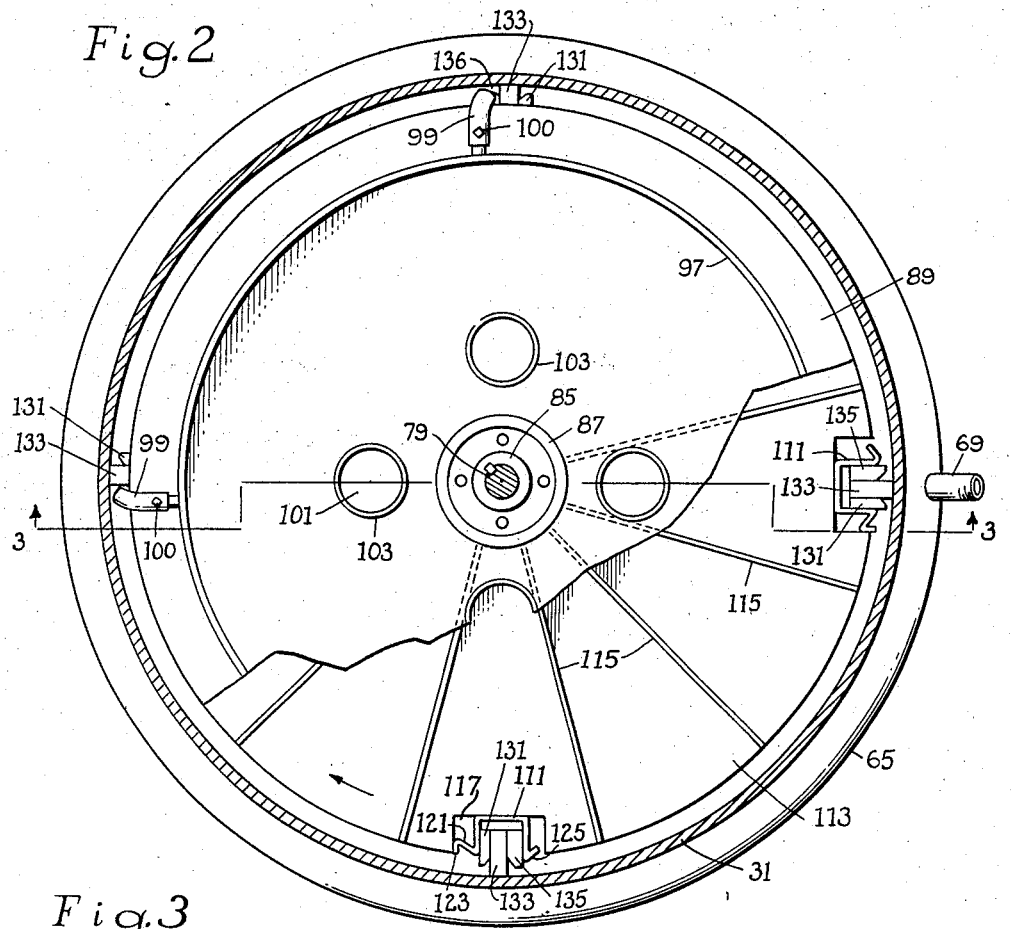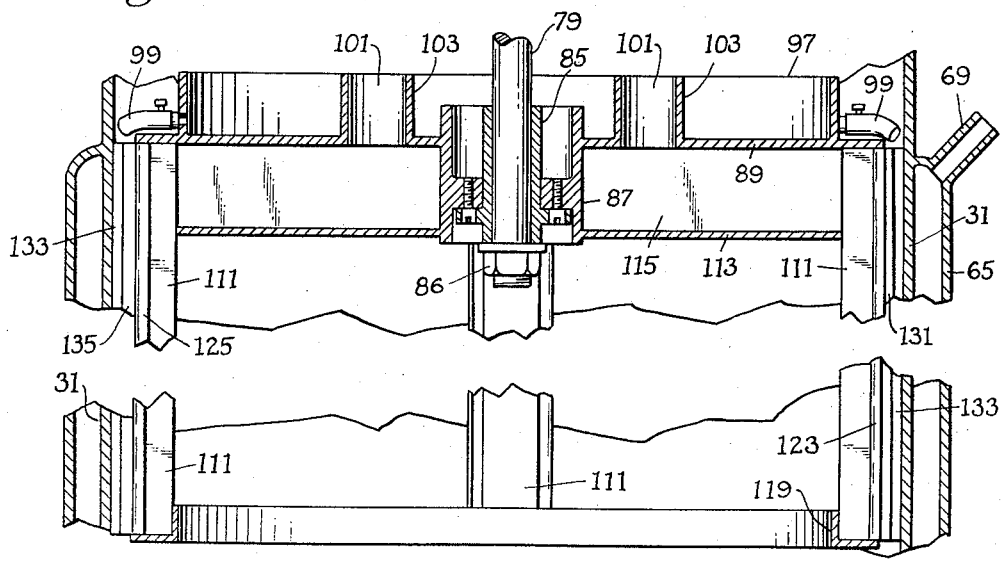

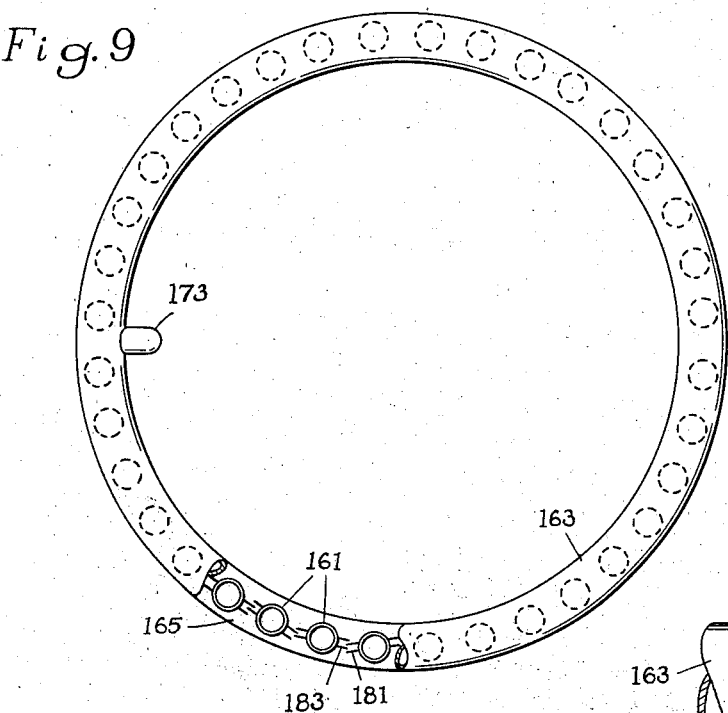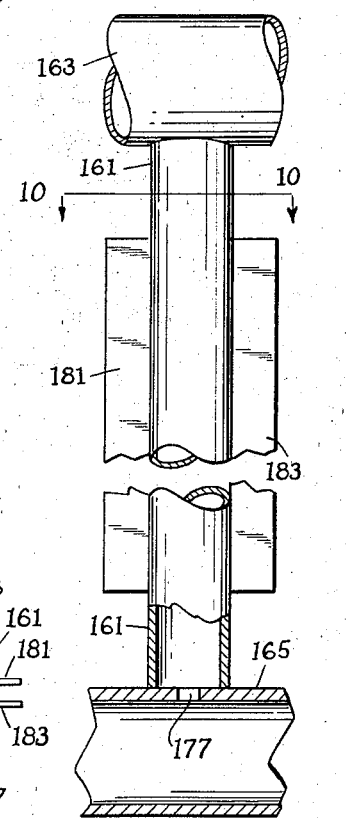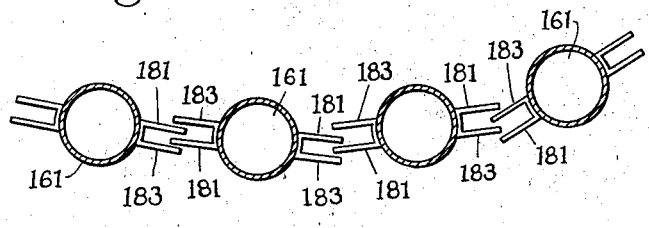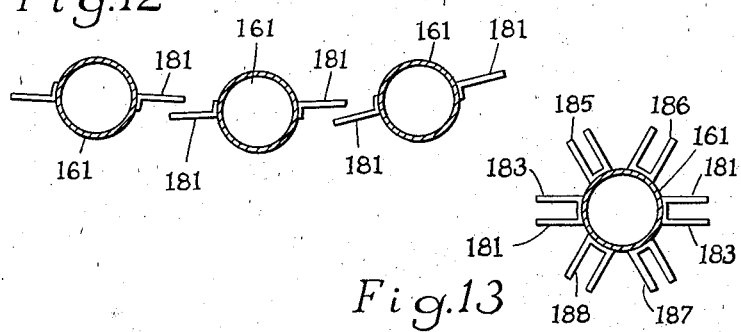

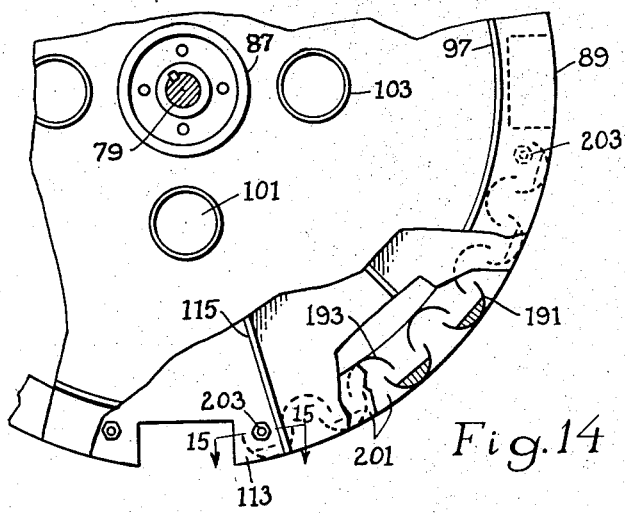
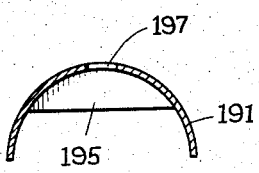
Fig.16
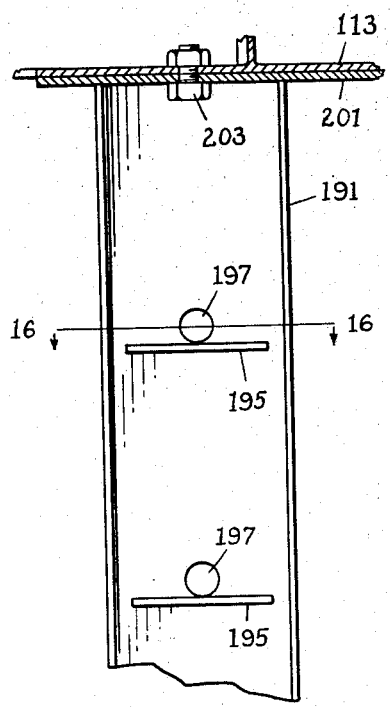
Fig.14
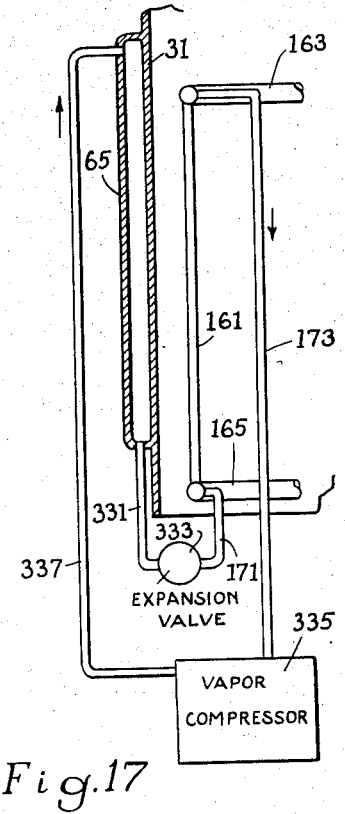
Fig.15
Fig.17

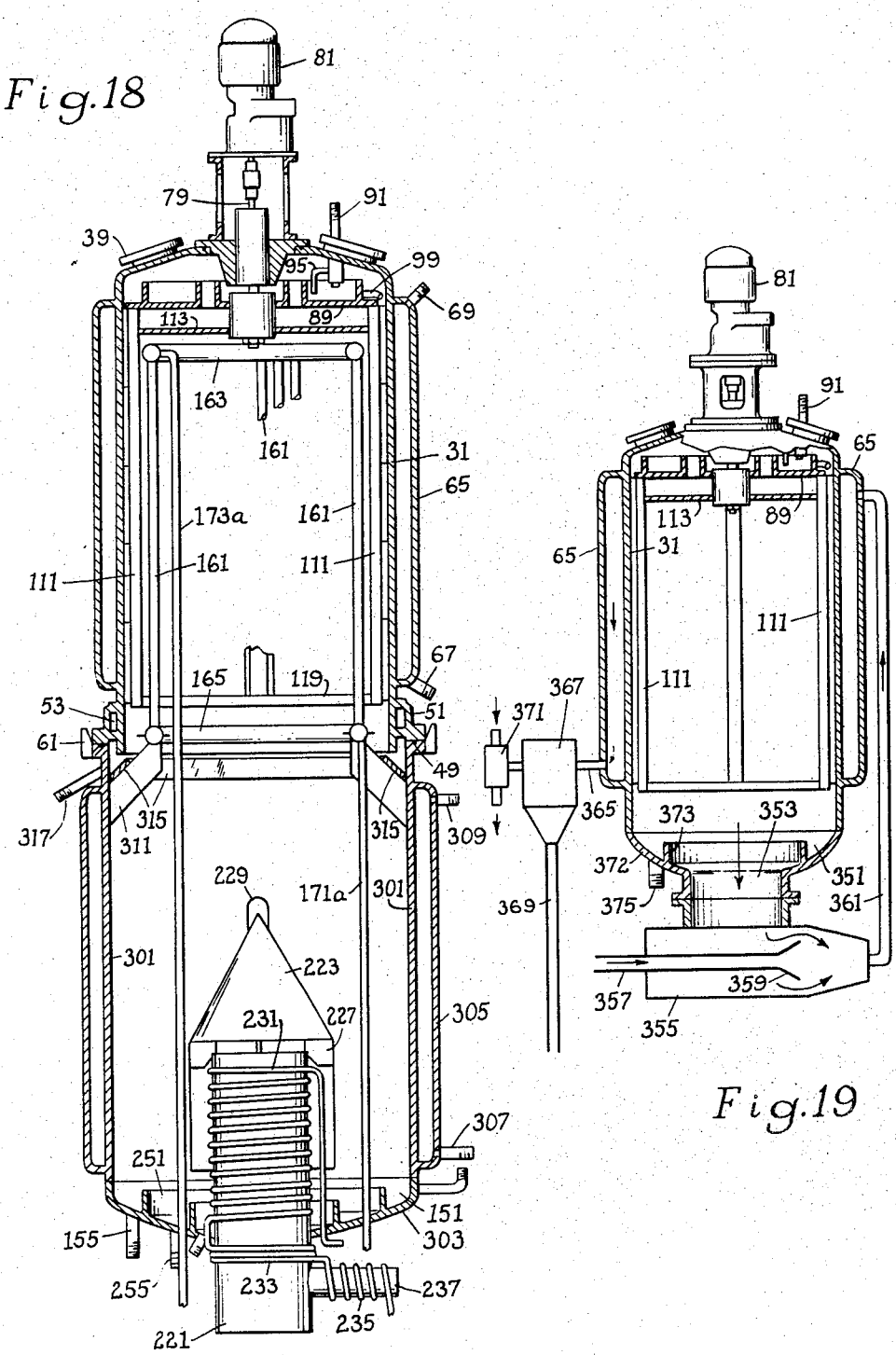

United States Patent Office 2,955,990
Patented Oct. 11, 1960

2,955,990

DISTILLING APPARATUS AND METHOD

Arthur F. Smith, 1516 Lake Road, Webster, N.Y.

Filed Mar. 15, 1956, Ser. No. 571,626

11 Claims. (Cl. 202—64)

This invention relates to distillation apparatus and to a method of distillation.

An object of the invention is the provision of generally improved and more satisfactory distillation apparatus, especially apparatus for distilling liquid in the form of thin films as distinguished from relatively thick bodies or masses of liquid.

Another object is the provision of an improved and more satisfactory method of distillation, particularly applicable to distillation of thin films of liquid.

Still another object is the provision of improved means for degassing the distilland or liquid to be distilled.

Another object is the provision of improved means for applying the distilland to the heated walls from which it is distilled.

Still another object is the provision of improved and more satisfactory means for regulating the thickness of the film of distilland on the heated wall from which it is distilled, and for regulating the rate of travel of the film along the heated wall.

Another object is the provision of improved wiping means movable with relation to the wall to which distilland is applied, for regulating the thickness of the film or layer of distilland, regulating the rate of travel thereover, and creating turbulence in the film of distilland.

Still another object is the provision of an improved form of condenser for use with a still.

A further object of the invention is the provision of an improved form of entrainment separator for a still, and particularly one which will increase the thermal efficiency of the still by decreasing the passage of heat from the hot or distilling surface of the still to the cold or condensing surface thereof.

A still further object is the provision of improved vacuum producing means, so located as to reduce the need for vacuum conduit joints externally of the still, thereby reducing the leakage under high vacuum conditions.

A further object is the provision of an improved thermal circuit or heat transfer circuit for a still.

A further object is the provision of a still having a combination of improved features useful both in carrying on high vacuum or molecular distillation, and in carrying on distillation at lower vacuum or even at atmospheric pressures.

Another object is the provision of distillation apparatus and a distillation method particularly useful where there is no adequate supply of cooling water of a low temperature.

A still further object is the provision of an improved distillation method effective to produce a relatively high degree of thermal efficiency.

These objects are attained, according to the present invention, by providing a still preferably of upright cylindrical form, in which the distilland or liquid to be distilled is introduced into the top of the still chamber so as to flow over a revolving plate arranged approximately horizontally, outward flow over this plate being promoted by centrifugal force. During the flow over this plate the final degassing of the distilland occurs. Then the distilland is applied to the cylindrical side walls of the still chamber, near the top thereof, to flow down such side walls. Wipers or wiping assemblies movable over the walls serve, according to various possibilities of adjustment, to control the thickness of the film as it flows down the walls of the still, to create turbulence therein in order to promote the distillation process, to push the liquid downwardly to speed up its travel over the walls of the still or to push it upwardly to slow down its travel, and to wipe the walls clean from time to time ot prevent undesirable accumulations on the walls. The vapors evaporated from the film of distilland on the heated walls of the still pass (in most cases) to condenser elements so arranged as to prevent any substantial passage of uncondensed vapors into the inlet of the vacuum creating or maintaining part of the apparatus. Under certain conditions, this passage of the evaporated vapors from the hot walls of the still to the condenser elements is impeded by an entrainment separator especially formed to increase the thermal efficiency of the still by greatly decreasing the passage of heat from the hot evaporating wall to the cold condenser elements.

The above mentioned and other desirable objects of the invention may be attained in the manner disclosed as an illustrative embodiment of the invention in the following description and in the accompanying drawings forming a part hereof, in which:

Fig. 1 is a vertical section taken centrally through a still in accordance with a preferred embodiment of the invention;

Fig. 2 is a horizontal section taken approximately on the line 2—2 of Fig. 1;

Fig. 3 is a fragmentary vertical section taken approximately on the line 3—3 of Fig. 2;

Fig. 9 is a top plan view, with parts broken away and parts in horizontal section, of the condenser according to a preferred form of the invention;

Fig. 10 is a horizontal section through a portion of the condenser shown in Fig. 9, on a larger scale, the section being taken approximately on the line 10—10 of Fig. 11;

Fig. 11 is a fragmentary elevation, with parts broken away and parts in vertical section, through a portion of the condenser shown in Figs. 9 and 10, on a larger scale;

Fig. 12 is a view similar to Fig. 10 showing a modified form of the condenser.

Fig. 13 is a similar horizontal section through one condenser tube and its associated fins, illustrating still another modification;

Fig. 14 is a fragmentary top plan view with parts broken away and parts in horizontal section, of an entrainment separator interposed between the hot or evaporating surface and the cold or condensing surface, according to one form of the invention;

Fig. 15 is a fragmentary side elevation, with parts in vertical section, of the upper part of the entrainment separator shown in Fig. 14, the sectional part thereof being taken approximately on the line 15—15 of Fig. 14;

Fig. 16 is a horizontal section taken approximately on the line 16—16 of Fig. 15;

Fig. 17 is a diagrammatic view of a thermal circuit or heat exchanger circuit according to one aspect of the invention;

Fig. 18 is a vertical section similar in general to Fig. 1, showing a modified or alternative form of the invention; and Fig. 19 is a diagrammatic view similar to Fig. 1, illustrating a thermal circuit according to another aspect of the invention.

The same reference numerals throughout the several views indicate the same parts.

Figure 4:
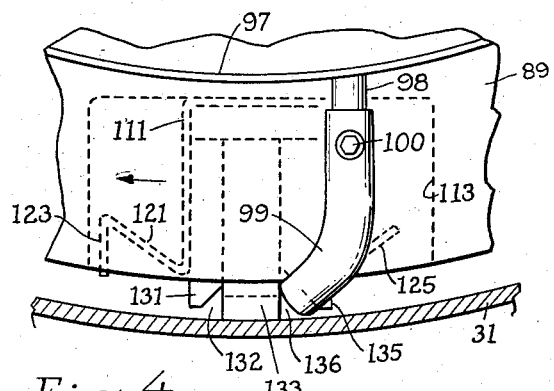
Fig. 4 is a view similar to a portion of Fig. 2, on a larger scale, and illustrating additional details.

The present application is, in many respects, in the nature of an improvement upon the invention disclosed in applicant's copending United States patent application, Serial No. 495,973, filed March 22, 1955, now abandoned, for Distillation Method and Apparatus. The present specification presupposes familiarity with the specification of said copending application, and it is believed unnecessary in the present case to repeat the various explanations heretofore given in said copending application.

Referring first to Fig. 1, the still according to a preferred embodiment of the present invention comprises a still chamber or body which is in general of upright cylindrical form, having a cylindrical side wall 31 and a domed top wall 33 formed with a plurality of hand hole flanges 35 closed by observation glasses 37 held in tight sealing engagement with gaskets on the flanges 35 by clamping rings 39 which may be removed in order to take off any desired one of the observation glasses for the purpose of obtaining limited access to the interior.

Figure 8:
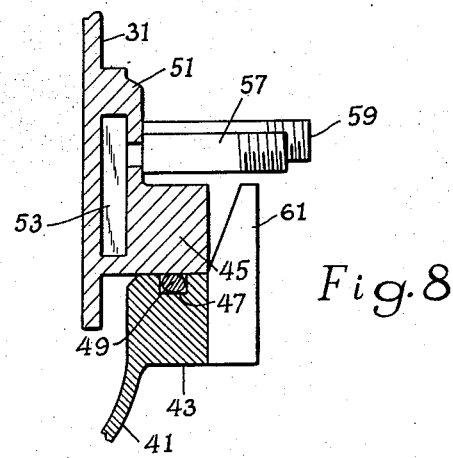
Fig. 8 is a fragmentary vertical section illustrating a detail of the water jacket and seal at the joint between two parts of the still.

These parts rest, in the preferred form, upon a dished bottom member 41 provided with an external horizontal flange 43 (Figs. 1 and 8) which forms the support for a horizontal flange 45 at the bottom of the main upright body 31 of the still. The top face of the flange 43 is provided with an annular groove 47 concentric with the vertical central axis of the still, for receiving the O-ring seal 49 which makes tight contact with the ring 43 and with the overlying smooth bottom face of the ring 45, to produce a pressure-tight seal at this point. Preferably the upturned marginal edge of the bottom 41 is of slightly larger diameter than the wall 31 of the still body, and the bottom edge of the wall 31 projects axially inside of and is spaced radially inwardly from the edge of the bottom 41. A supplementary band or ring 51 surrounds the lower part of the wall 31 and is spaced from it to provide a water jacket space 53 located between the wall 31 and the flange 45, and fed with cooling water or other cooling fluid through a conduit 57 and discharge conduit 59, to minimize transference of injurious heat from the hot evaporating surface 31 to the flange 45 and thence to the O-ring seal 49.

The bottom member 41 is supported permanently in stationary position by any suitable supporting means, and it in turn serves to support the upper still structure including the upright cylindrical wall 31 and all parts carried thereby, which simply rest by gravity on the flange 43. Preferably there are three locating lugs or guide lugs 61 welded or bolted to the stationary ring 43 and projecting vertically upwardly at suitable intervals around the periphery, to hold the upper structure accurately in axial alinement with the lower or bottom structure 41, when the parts are put back together after separation.

The vertical cylindrical wall 31 constitutes the hot wall or evaporating surface of the still, and is heated by any suitable means, such as electrical heaters wound around the outside or otherwise cooperating externally with the wall 31, or preferably by one or more heating jackets 65 externally surrounding the wall 31 and supplied with heating fluid through entrance and exit conduits 67 and 69, or vice versa. The heating jacket is here shown as a single jacket extending through substantially the entire effective height of the side walls 31 of the still (terminating above the cooling water jacket 53, however) but it is within the scope of the invention to subdivide this heating jacket into two or more sections, one above another, if it is desired for any reason to have differential heating, with the distillation wall heated to a higher or lower degree at the top of the still than at the bottom. In fact, such subdivision is essentially what is done in the alternative construction shown in Fig. 18, where the upper jacket heats the evaporating wall and the lower jacket cools the condensing wall, as further explained below.

The domed top 33 of the structure has a central aperture surrounded by a thick and substantial flange 71 having on its upper face an annular slot for containing an O-ring seal 73 to make sealing engagement with a bearing support 75 removably mounted on and supported by the ring 71. The bearing support 75 contains a pressure-seal stuffing box and bearing indicated in general at 77, through which passes a vertical shaft 79 driven by any suitable driving motor and reduction gear indicated in general at 81 and mounted on the top of the apparatus.

This shaft 79 projects downwardly into the interior of the distillation chamber, and, as seen especially in Fig. 3, carries at its lower end a collared sleeve 85 held on the splined lower end of the shaft by a nut 86. To the sleeve 85 is fixed a hub 87 which, in turn, carrier a horizontally extending plate 89 which constitutes the degassing plate in the preferred embodiment of the invention. The liquid distilland is introduced onto the top of this plate 89 through a distilland inlet conduit 91 (Fig. 1) passing through the top wall of the still chamber in tightly sealed relation therewith, and leading to a pressure relief valve 93 from which the distilland issues through a short outlet pipe 95 which deposits the distilland on the top surface of the plate 89 at a point spaced materially inwardly from the extreme outer edge of the plate. With this arrangement, all of the distilland delivery piping up to the valve 93 carries distilland under pressure rather than vacuum, thus avoiding the tight sealing joint difficulties encountered in vacuum conduits.

As the plate 89 rotates with the shaft 79, centrifugal force will cause the distilland to flow horizontally over the top face of the plate 89, in a comparatively thin film, during which travel any gas remaining in the distilland is drawn off by the vacuum within the distillation chamber. This plate, therefore, constitutes an excellent and final degassing surface. As the distilland flows outwardly toward the periphery of the plate 89, it comes against an upstanding marginal flange 97 (Figs. 1 to 5) extending around the plate near its outer edge, and flows out through a plurality of discharge openings in this flange 97, which leads to short horizontal discharge conduits 98 over which curved discharge pipes or nozzles 99 are adjustably held by set screws 100. The discharge orifices of the pipes 99 terminate very close to the inner face of the hot evaporting wall 31, so that the distilland is applied thereto in a very favorable manner, impinging upon the wall at low pressure and low velocity, without substantial spattering or splashing.

At various intervals in a circumferential direction, the degassing plate 89 is provided with a plurality of openings 101 (Figs. 2 and 3) each surrounded by an upstanding circular flange 103 so that the liquid on the top face of the degassing plate cannot flow down through these openings. These openings provide relatively free communication between the space above the degassing plate and the space below.

As the liquid applied to the evaporating wall 31 by the conduits 99 begins to flow by gravity down this wall, it is immediately subjected to the action of wiper assemblies which may be adjusted in various ways to produce various different effects desired. The wiper assemblies comprise a plurality of vertical channels 111 (Figs. 2 and 3) located at spaced intervals in a direction around the circumference of the wall 31, the upper ends of these channels being welded to and supported by the outer marginal edge of the degassing plate 89 as well as an additional support plate 113 located below the plate 89 and connected to the hub 87 near its lower end, the structure being strengthened by various vertical reinforcing webs 115 extending between the plates 89 and 113 and welded at their top and bottom edges to both of them.

The bottom ends of the respective channels 111 are connected to each other, to prevent sway, by means of a ring 119 (Figs. 1 and 3) of angular cross section. This ring merely steadies the vertical channels 111, however, and does not support any of their weight, the entire weight of this structure being supported from the plates 89 and 113. As the shaft 79 rotates, carrying the hub 87 and plates 89 and 113 with it, it will be apparent that the vertical channels 111 likewise rotate about the central axis of the still.

The wiper structure or assembly, including these channels 111, rotates in a clockwise direction when viewed from above as in Figs. 2 and 4. Each channel 111 is open at its front which faces radially outwardly toward the cylindrical wall 31, and is closed at its inner or back wall toward the central axis of the structure, as well as at its lateral walls. The leading edge of each channel, with reference to the direction of rotation, has a flange extending obliquely laterally and inwardly as at 121, then a short distance radially outwardly as at 123. The trailing edge of the channel has a lateral flange 125 extending a short distance obliquely laterally and inwardly, the shapes of these flanges being best seen in Figs. 4 and 6.

Extending vertically within each channel 111 is a scraper or wiper blade assembly consisting of a plurality of blades, preferably three in number, the respective blades being designated in Figs. 4–7 by the numerals 131 identifying the blade at the leading side of the channel, 133 identifying the middle blade, and 135 identifying the blade at the trailing side of the channel. The blades are adjustable with respect to each other and capable of being clamped in any desired adjusted position by means of clamping bolts 137 extending tightly through holes in the middle blade 133 and through horizontal adjustment slots in the blades 131 and 135.

These sections 131, 133, and 135 of the wiper blade assembly are of such thickness that the combined thickness of the three sections is just a trifle less than the interior width of the channel 111, so that the sections are freely slidable within the channel without binding. The sections 131 and 135 are recessed or countersunk to receive the head of the bolt 137 and the nut thereof, so that these parts do not scrape against the walls of the channel 111. By taking the assembly out of the channel 111 (when the evaporator or still structure is opened up, of course), and loosening the bolt 137, the three members 131, 133, and 135 may be adjusted at will relative to each other so that all three may be simultaneously in engagement with the wall 31 of the still, or any desired one or two of these members may have its outer edge drawn back relative to the third member, so as not to contact with the wall of the still, and the adjustment may be varied to any extent desired, to produce any particular condition desired.

Figure 6:
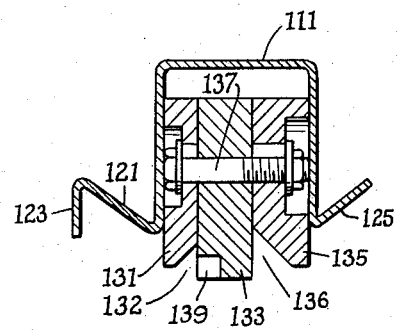
Fig. 6 is a horizontal section taken substantially on the line 6—6 of Fig. 5.

The trailing corner of the first wiping member 131 is beveled off to provide a small triangular notch 132 extending throughout the full height of the blade assembly, and the leading corner of the third wiping member 135 is beveled off to provide a similar and somewhat larger triangular notch 136, the member 135 being preferably thicker than the member 131, as well seen in Fig. 6.

The outer or wall-contacting face of the middle wiping member 133 is provided with a series of oblique grooves, slots, or notches 139, extending in the general direction of rotation of the structure but sufficiently skewed or angled obliquely to the direction of rotation so that the trailing edge of what may be called one face block or one contact portion 141 (between the grooves 139) overlaps the leading edge of the next face block 141 below or above it, depending on whether the slots extend obliquely downwardly or obliquely upwardly from leading edge to trailing edge. Although the grooves or slots and the intervening block areas may take various forms (see Figs. 5, 5A, and 5B), yet in each form the overlapping relationship will be present, so that as the member 133 wipes over the inner face of the wall 31, during rotation of the rotor, any given point on the wall throughout the height of the wiper blade assembly will be wiped by one or another of the face blocks or face portions 141, there being no point on the wall of the still which will simply pass through one of the slots 139 without receiving any wiping action.

This is one of the important distinctions between the present application and the copending application above mentioned. It has been found highly advantageous to make the slots oblique or angular as herein disclosed, to obtain the wiping and cleaning action on all portions of the wall, rather than having the slots extend horizontally as in said copending application, with the result that the portions of the wall opposite the slots will not receive a wiping and cleaning action. The slots may, of course, be curved instead of straight, so long as the overlapping relationship is maintained.

Figure 5:
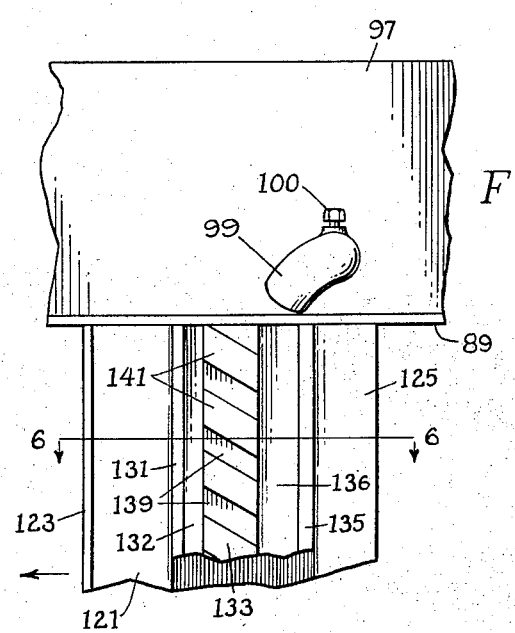
Fig. 5 is an elevation of the parts shown in Fig. 4, with the wall of the still removed in order to show the parts within, illustrating one form of notch in a wiper blade.
Figure 7:
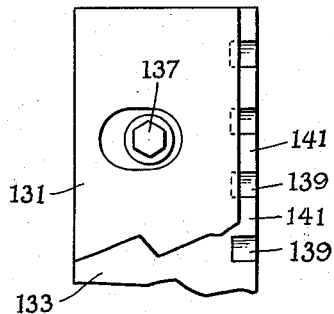
Fig. 7 is a side elevation of a portion of the wiper unit shown in Figs. 5 and 6.
Figures 5A, 5B:
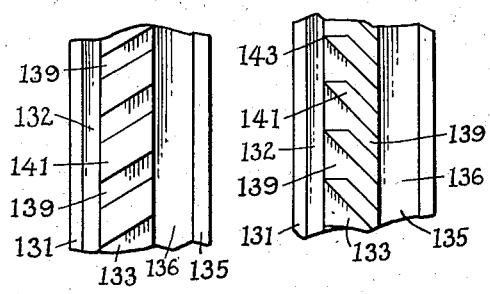
Fig. 5A is a view similar to a fragment of Fig. 5, showing a different form of notch in the notched wiper blade.
Fig. 5B is a view similar to Fig. 5A, showing still another form of notch in the wiper blade.

Moreover, the oblique slots serve the further purpose of altering the time cycle of flow of the film of distilland, down the wall 31 of the still. Assuming that the wiping member 133 is so adjusted that it is in contact with the wall face 31 (which is not always the case, for sometimes it may be adjusted to be spaced from the wall) it is seen that when the slots 139 are inclined upwardly, as shown in Fig. 5A, the horizontal rotation of the member 133 tends to raise the distilland flowing down the wall being wiped, thereby impeding the downward flow thereof and keeping the distilland in contact with the distilling surface or evaporating surface for a longer time than if it flowed freely downwardly by gravity. On the other hand, when the member 133 is provided with notches 139 extending obliquely downwardly as in Fig. 5, the reverse effect is produced, and the slots 139 serve to increase the rate of downward flow of the distilland, pushing it downwardly and hurrying it along so that the distilland remains in contact with the hot evaporating surface for a lesser time than would be the case if it merely flow downwardly by gravity. With either the downwardly or the upwardly slanting form of block and notch, the leading edge of the block may be tapered to a point as shown at 143 in Fig. 5B, the angularity of the notches 139 being somewhat increased so that the desired overlapping relationship still exists. This enables the leading edge of each block to plow into and separate or part the liquid film of distilland more easily and with less chance of splash or spatter than when the leading edge is wide in a direction perpendicular to the direction of travel, as in Figs. 5 and 5A.

The wiping blades 131, 133, and 135 preferably do not extend continuously as integral members from top to bottom of each channel 111, but are broken up into a number of sections of moderate length, each being, for example, from 6 to 12 inches long, the sectionalized construction being indicated in Fig. 1. Each section has one of the adjusting bolts 137 near its top upper end and one near its bottom end, as shown. Hence if the side wall 31 of the container is slightly out of true cylindrical shape, due to manufacturing irregularities, the sectionalized construction of the wiper blades allows each individual short section of the structure to move radially outwardly far enough to contact with the wall 31, according to the particular diameter of the wall at that particular horizontal zone, notwithstanding that the wall may be of a slightly different diameter above and below the zone occupied by the particular section in question. Likewise, if the wall 31 at any particular height zone is not truly circular, the wiper blades may slide radially inwardly or outwardly in the guide channels 111, to follow any reasonable variations in contour of the wall 31. Centrifugal force produced by rotation of the rotor structure is preferably used to keep the wiper blades in contact with the wall 31, but if desired, this centrifugal force may be supplemented by a series of flat leaf springs placed in the base of each channel 111, pressing outwardly against the rear edges of the members 131, 133, and 135.

Any desired number of channels 111 with wiper blade assemblies in them may be used, depending upon the diameter of the still and the characteristics of the material being distilled. For satisfactory use with a wide range of distilland material, in a still having an internal diameter of about three feet, it is convenient to use four of the channels 111 and wiper blade assemblies, as seen in Fig. 2, and a proportionately larger number of wiper blade assemblies for stills of larger diameter. The number of discharge pipes 98, 99 for discharging the distilland against the side walls of the still is preferably equal to the number of wiper blade assemblies, one discharge pipe being located close to each wiper blade assembly at the top thereof, as well seen in Figs. 2, 3, and 4. The discharge end of the curved pipe 99 is preferably adjusted to be positioned directly over and close to the large notch 136 formed by the bevel of the leading edge of the member 135, as seen in Fig. 4, so that as the distilland liquid issues from the pipe 99, it tends to flow straight down through this notch 136.

As already indicated, the three wiping members 131, 133, and 135 may be adjusted to a variety of positions relative to each other, depending on the distilland film conditions desired. At least one of these three members is in contact with and rides along the wall 31 of the container at all times, and the adjusted positions of the other members is such that one or both of them are spaced somewhat inwardly from the wall 31.

In most cases, the middle wiping member 133 is in contact with the wall 31, and determines the position of the other two wiping members 131 and 135, both of which are spaced slightly inwardly from the wall. The spacing of the outer edge of the member 135 from the evaporating wall will determine the thickness of the film of distilland which is left on this wall, and can be made anywhere from a very few thousandths of an inch (say, for example, 0.003 of an inch) up to any desired maximum thickness (say, for example, 0.050 of an inch). As the liquid is supplied at the top of the notch 136 by the pipe 99, it flows down this notch, spreads out on the evaporating wall to the thickness determined by the spacing of the member 135 from the wall, and the excess liquid continues on down the notch, falling down from the bottom of the wiper assembly along the remaining terminal part or lower end portion of the wall 31, and dropping from the bottom edge of the wall into the gutter space 151 (Fig. 1) formed between the side of the bottom section 41 and a gutter flange or ring 153 welded to the bottom 41 and rising therefrom, having a diameter somewhat less than that of the wall 31. From this gutter the excess distilland is removed through the pipe 155, for recirculating through the same still, or for circulation through another still in a series of stills, or for other processing as desired.

The adjustment of the first or leading wiper blade 131 is such that this blade usually is spaced from the evaporating wall, possibly entirely free of the liquid film on the wall, or possibly contacting lightly with the exposed face of this film, to create some turbulence therein. Then a moment later, when the notched wiping blade 133 reaches the film, the evaporating surface is wiped clean by the projecting block portions 141 of this wiping blade, and the liquid remaining in the film moves through the notches 139, being given a component either in an upward direction when the notches slant upwardly as in Fig. 5A, or preferably a component in a downward direction when the notches slant downwardly as in Fig. 5 or Fig. 5B. In either event, the distilland liquid after passing through these notches mingles with the fresh supply of distilland flowing down the notch 136, and spreads out as a new film of whatever thickness is allowed by the adjustment of the third or trailing wiper blade 135.

At other times, if it is desired to shorten the period of contact of the distilland with the distilling wall of evaporating wall, the first or leading wiper blade 131 may be adjusted to make direct contact with the wall, so that all of the distilland remaining on the wall at this point will be cleanly wiped off and will run down rapidly in a rivulet or column of liquid just in advance of the leading edge of the wiper blade 131. The flange portions 121 and 123 of the channel 111 serve to confine this descending rivulet of liquid and prevent it from splashing inwardly toward the center of the apparatus.

When the first wiping member 131 is adjusted to make contact with the liquid film on the wall of the still, the horizontal motion of the wiper over the film may cause some splashing or spattering of the liquid, which splashing or spattering is caught and trapped by the flanges 121 and 123. On the other hand, when the wiper blade 131 is adjusted to a position out of contact with the film of distilland on the wall of the still, it is preferably placed fairly close to the liquid film so that the blade 131 itself acts as a trap or baffle for catching the splash or spatter caused by the advancing or leading edge of the second wiper blade 133 engaging the liquid film. The notch or space 132 at the beveled corner of the first blade 131 is useful for this purpose, in helping to trap any agitated or spattering liquid and in providing a space for a rivulet of such liquid to run down to the bottom of the still. Any splashing not caught by the first blade 131 will then be caught by the flanges 121, 123 which in this instance form a second trap or baffle to prevent spattering from reaching the condenser which, as explained below, is located inwardly from the channels 111.

The speed of rotation of the wiper mechanism may vary considerably. A surface speed (that is, the circumferential speed of travel of the wiper blades over the wall 31) of about 600 lineal feet per minute is satisfactory for many cases, but this speed is intended as a typical example rather than as a limitation, since the surface speed may be considerably greater or less than this figure. A surface speed of 600 feet per minute corresponds to about 64 revolutions per minute in a typical small still having an internal diameter of three feet, or 32 revolutions per minute in a larger still having a diameter of six feet, and so on proportionately for stills of other sizes.

The oblique notches 139 in the face of the wiper blade 133 may be considered as decelerating or accelerating pumps, to slow or to hasten the downward flow of the film of distilland over the evaporating wall 31 of the still. The typical case is to have the slots slant downwardly to accelerate or speed the downward travel of the film, so that it will be subjected to the hot evaporating surface for a shorter length of time. With the slots slanting downwardly approximately as shown in Fig. 5, and with the rotor revolving at a rate to give the wiping blades a surface speed of about 600 feet per minute, it is found that a film of distilland, having a viscosity close to that of water, can be accelerated to have a downward linear speed, from top to bottom of the still, of approximately 300 feet per minute. This is much faster than the same distilland would flow down the still by gravity alone, and illustrates one of the important advantages of the present invention when used for distilling delicate substances which should have only brief exposure to the hot evaporating surface.

The vapors distilled off of the hot evaporating surface 31 of the still pass inward in a general radial direction toward the center of the still, and are intercepted by and condensed on the various cold surfaces of the condenser. According to the present invention, the condenser comprises a series of vertically extending tubes 161 (Figs. 1 and 9–11) welded to and opening at both ends into respective top and bottom headers 163 and 165 which are of annular or circular tubular form, and of a diameter slightly less than the clear space between the backs of the diametrically opposite wiper blade channels 111. The bottom header 165 is preferably the inlet header, and is supported from the bottom 41 of the still by supporting brackets 167 arranged at intervals circumferentially around the header 165, and is supplied with refrigerant through an inlet conduit 171 (Fig. 1) extending up through the bottom 41 of the still. The upper header 163 is preferably the outlet header of the condenser, and the refrigerant leaves this header through a conduit 173 (Fig. 1) extending down from the header a little inside the ring of condenser tubes 161, and out through the bottom. In this construction, the condenser is supported entirely from the bottom, and is free standing without any support from the side walls of the still and without any interference with the rotor comprising the vertical channels 111 and the wiping blades mounted therein. Hence when the still is opened to obtain necessary access to the interior, the still body 31 is lifted vertically upwardly, separating from the bottom 41 at the joint between the flanges 43 and 45, and the rotor parts 111, etc., are lifted upwardly with the body 31 and the jacket 65, leaving the condenser 161, 163, 165 in stationary position standing upright from the stationary bottom 41.

The outlet openings at the upper ends of the condenser tubes 161, where they enter the outlet header 163, are preferably unrestricted; that is, of substantially the same size as the internal diameter of the tubes 161. However, to promote uniform flow of refrigerant through all of the condenser tubes, the inlet openings from the bottom header 165 into the bottom ends of the tube 161 are considerably restricted as shown at the bottom of Fig. 11, each inlet opening 177 preferably having an area approximately equal to the cross sectional area of the inlet header 165 divided by the number of vertical tubes 161 in the condenser. This promotes an approximately uniform flow of refrigerant through all of the tubes and avoids a concentration of flow of refrigerant through a few of the tubes 161 closest to the point where the inlet conduit 171 enters the header 165, with a decrease of sluggishness of flow of refrigerant through those tubes which are farthest from the inlet conduit 171.

Preferably the vertical tubes 161 of the condenser are of circular cross section, and are spaced laterally from each other through center to center distances of approximately twice the diameter of each tube, so that there is lateral space between the tubes equal approximately to the diameter of one tube, as seen in Figs. 9–12. These spaces between the tubes are closed by trapping flanges or baffles which overlap with each other in such way as to leave no straight path of travel along which droplets of splashed or entrained liquid can be drawn inwardly through the condenser to the center of the still, where such droplets might tend to enter the vacuum pump apparatus and cause an unnecessary load on the pump.

These flanges or baffles may be in the form of single radial flanges 181, two on each tube 161 arranged approximately diametrically with respect to each other, welded to the exterior of the tube and of such width as to overlap the corresponding flanges on the next adjacent tubes on either side, as shown in Fig. 12. It will be noted that although each flange 181 on one tube overlaps the flange of the next tube, it is spaced a little from it, to provide for communication through an indirect or angular path between the still space outside the ring of condenser tubes and the still space inside the ring of condenser tubes, but to prevent any straight line communication in a direct radial path. However, it is preferred to use multiple flanges instead of single flanges at each side of each tube 161, the preferred arrangement being shown in Fig. 10, where in addition to the flange 181 there is a second flange 183 extending parallel to the flange 181 and preferably formed integrally therewith as part of a generally U-shaped member, welded to the side of the tube 161. In this preferred construction, one of the flanges 181, 183 at each side of each tube projects into the space between the two flanges 181 and 183 of the next adjacent tube, as will be plainly seen from studying Fig. 10. This provides a better trap or maze preventing droplets or entrained liquid from passing through the condenser toward the center of the still, since any droplet would have to make several turns or bends to get through the trap, with much greater likelihood of coming into contact with one of the cold surfaces, than is the case with the simpler form of trap shown in Fig. 12.

In addition to the lateral flanges which overlap with each other to provide a trap or maze, each condenser tube 161 may also be provided, if desired, with additional flanges for the purpose of increasing the area of the cold condensing surface. An example of this construction is shown in Fig. 13, where in addition to the diametrically opposite pairs of flanges 181 and 183 for baffle or maze purposes, there are also other U-shaped flange bodies indicated in general at 185, 186, 187, and 188, welded to the tube 161 and spaced circumferentially around the tube. Any desired number of such flanges may be used on each tube, six being convenient.

It has been mentioned that the still of the present invention may be used not only as a high vacuum or short path molecular still, but also as an ordinary or long path still for distilling liquid at lower pressures than the extremely high vacuum normally used in molecular distillation, or even at atmospheric pressure. When the still is used as a high vacuum or molecular still, preferably there are no baffles interposed between the hot evaporating surface 31 and the cold condensing surface formed by the condenser tubes 161 and their associated fins, so that the distilled molecules can move directly in a straight line and through a short path, from the hot evaporating surface to the cold condensing surface. However, when the still is used for ordinary distillation (that is, at lower vacuum or higher pressure than that required for molecular distillation) it is preferable to insert baffles both to prevent free passage of entrapped liquid from the evaporating surface to the condenser surface, and also to reduce the heat loss from the evaporator to the condenser. This is accomplished very simply, according to the present invention, by means of removable baffle units which are placed on the rotor of the still in the spaces between the wiper blade channels, when it is to be used for ordinary non-molecular distillation, and which are taken out of the still when it is to be used for molecular distillation.

The baffle units are best shown in Figs. 14–16. Each unit comprises a series of laterally spaced vertical members 191 curved so as to be of approximately semi-circular horizontal cross section with their concave sides faced inwardly toward the center of the still, laterally separated from each other and staggered with respect to a second series of similar members 193 with their concave sides faced outwardly away from the center. As seen in Fig. 14, each member 191 lies opposite and is wider than the space between two adjacent members 193, and each member 193 lies opposite and is wider than the space between two adjacent members 191. The inner edges of the members 191 are substantially on the same circle or same radius as the outer edges of the members 193. As will be apparent from Fig. 14, any vapors and entrapped liquid molecules attempting to pass from the hot evaporating surface inwardly toward the condenser, will have to enter the curved or hollow space within one of the members 193, then will have to turn abruptly and pass outwardly away from the center of the still, through the space between the edges of the member 193 and the edges of the overlapping members 191, then will have to turn abruptly again to leave the member 191 and pass between two adjacent members 193 and inwardly to the cold condensing surface. These abrupt bends greatly increase the chance that any molecule of distilland in liquid phase, entrapped in and traveling with the distilled vapors, will be projected against and come in contact with one or another of the members 191 and 193, thereby stopping the travel of the molecules in liquid phase and preventing such undistilled molecules from reaching the condenser surface.

Any liquid accumulating on the inner faces of the members 193 will flow to the outer edges of these members, on account of the centrifugal force generated by the revolution of the members 191 and 193, which are mounted on and move bodily with the wiper blade rotor as further explained below. The droplets of liquid will be centrifugally thrown from the outer edges of the members 193 and will enter the adjacent members 191, where centrifugal force will make the liquid tend to collect at the center (considered in cross section) of the members 191. At intervals throughout the height of each member 191 there is a small horizontal partition 195 to catch any liquid tending to descend by gravity and stop descent thereof, and just above each partition 195 is a hole 197 extending through the member 191, so that the centrifugal force of rotation will throw the accumulated liquid through the holes 197 back onto the hot evaporating surface.

For easy installation and removal of the baffle members 191, 193, they are assembled into groups, each of sufficient arcuate extent to fill the space from one of the wiper blade channels 111 to the next channel. The baffles of each group are welded at their top and bottom ends to arcuate top and bottom plates 201. The top arcuate plate 201 fits snugly against the bottom face of the plate 113, in the intervals between successive wiper channels 111, and is bolted thereto by bolts 203. Similarly the bottom arcuate plate rests upon and is bolted to the bottom ring 119 which is connected to and supported from the wiper channels 111. When the body of the still is lifted off of the base thereof to an elevated position, the rotor comes up with the body, but may then be dropped off of the shaft 79 by removing the nut 86, to leave the rotor free and unobstructed so that the baffles may be installed or removed.

In addition to serving as traps for molecules in liquid phase, the baffles 191, 193 serve also as heat conserving means, impeding the otherwise wasteful flow of heat from the hot evaporating surface 31 of the still to the cold condenser surface. The members 191 and 193 are made of highly polished metal, so as to reflect the radiant heat from the walls 31 back outwardly toward these walls again, thereby greatly cutting down the heat loss from the hot evaporating surface.

Another feature of the present invention resides in the location of the diffusion pump which produces the desired vacuum within the still, particularly when carrying on molecular distillation under relatively high vacuum. Referring now to Fig. 1, the usual diffusion pump casing or stack 221 extends up through the bottom 41 of the still, centrally thereof, and is covered by a conical hood 223 with a cylindrical skirt 225, supported by a series of spaced bracket flanges 227 which rest on the stack. A lifting ring 229 at the top of the hood serves for lifting it upwardly when required.

The pump stack 221 is surrounded by the usual cooling coil 231 around the major part of the stack 221 within the still, the coil being continued at 233 exteriorly of the still around the bottom portion or tail portion of the stack 221 which projects below the still bottom 41, and the coil continues at 235 around the exhaust conduit 237 which extends laterally from the lower part of the pump stack 221.

The construction and operation of the diffusion pump itself are well known, but the location of the pump is believed to be a novel and important feature constituting one aspect of the invention. Heretofore, it has been customary to place a diffusion pump mainly if not entirely outside of the still or other vacuum vessel, to which it has been connected by a conduit, thus necessitating tight seals in the high vacuum conduits or piping connecting the diffusion pump to the still, and eliminating any change of receiving cooling benefit within the still from the cooling coil of the diffusion pump. According to the present invention, the diffusion pump is mainly within the still, projecting below the bottom of the still only enough to provide minimum room for the lateral exhaust conduit 237. Thus the present arrangement greatly cuts down the need for vacuum-tight piping or conduits outside the still, and also serves to place the vacuum pump in a most compact location, in the center of the still in space which is otherwise waste space, and also has the further advantage of placing the pump cooling coil 231 within the still where, in addition to serving to cool the diffusion pump, it performs also the function of a last or final condenser tending to catch and condense any vapors which get past the main condenser 161, thereby lessening the load on the vacuum pump.

It may be emphasized here that the hood 223, 225 on the diffusion pump serves the triple function of (a) preventing drops in liquid phase from accidentally dropping straight down into the pump; (b) causing the matter drawn into the pump to take a circuitous path, first downwardly and around the lower edge of the flange 225 and thence upwardly, with increased likelihood that any entrained liquid will be thrown out of the vapor when it makes the turn around the lower edge of the flange 225; and (c) confining the vapor or other material entering the pump, in the last part of its entering movement, to a path of travel closely adjacent the pump cooling coil 231, with consequent great likelihood of contact with the cooling coil to cause condensation of any condensible components or ingredients in the entering stream.

The still walls 31, 33, and 41, the rotor parts 89, 111, 113, the condenser parts 161, 163, 165, and all other parts coming into contact with the distilland or its vapors (except the wiper blades 131, 133, 135) are preferably made of some suitable metal which is resistant to corrosion by the distilland. Stainless steel is suitable in most cases. Sometimes steel faced with glass is desirable. The wiper blades 131, 133, 135 are preferably made of carbon or a carbon-graphite composition. Other possible materials for the wiper blades are teflon, nylon, teflon-graphite mixtures, teflon molybdenum disulphide, phenol formaldehyde, and melamine compounds. In general, materials suitable for these blades are those having good wearing qualities on the wall being wiped, which are inert to the materials being processed and are stable thermally at the temperatures of operation, and which preferably also are easy to machine or otherwise form into the desired shapes.

To summarize briefly the operation of the construction thus far described, and assuming for the moment that so-called molecular distillation under high vacuum is to be performed, the interior of the still is evacuated to the desired high degree by operation of any suitable fore pump (not shown) together with operation of the diffusion pump 221. The distilland, or liquid to be distilled, is pumped under pressure through the inlet conduit 91 to the pressure release valve 93 located within the still, whence it issues at 95 onto the top surface of the plate 89 which constitutes part of the rotor and is constantly being rotated, during the progress of distillation, by the motor 81.

The liquid distilland is thrown outward toward the circumference of the plate 89, due to centrifugal force caused by rotation of the plate, spreading in a fairly thin film which provides a final degassing stage immediately prior to the distillation, thus tending to eliminate the last traces of gas which may have been left in the distilland during previous degassing steps conducted outside of the still. The distilland then leaves the plate 89 through the discharge conduits 99, and falls downwardly by gravity into the notch 136 between the wiper blade 133 and the wiper blade 135. The distilland leaves the delivery conduit 99 under relatively low pressure, caused merely by the centrifugal force of revolution of the rotor, rather than under high pressure as in certain prior types of distillation apparatus, and this low pressure delivery of the distilland serves to lay it on the hot distilling wall 31 smoothly and without the spatter and splashing which would be caused by high pressure discharge.

In normal operation, the middle wiper blade 133 is adjusted to be in contact with the inner face of the distilling surface 31, and the third or trailing wiper blade 135 is adjusted to be spaced away from the wall 31 by a space equal to the desired thickness of the distilland film or layer on the wall 31. Excess liquid, beyond the amount which can flow out through the confined space at the outer end of the blade 135, continues on down to the bottom of the still through the notch 136, and collects in the gutter 151 at the bottom of the still, from which it is removed through the discharge conduit 155.

The distilling surface or inner face of the wall 31 is constantly being wiped clean by the wiping blade 133 held in contact with the wall 31 by the centrifugal force of rotation of the rotor, so as to prevent any accumulation of polymerized product or other solid residue on the wall 31, and keep it clean at all times. The blade 131 at the leading edge of the wiper assembly may be adjusted to contact with the wall 31 to wipe the wall clean ready for the application of a fresh supply of distilland in the notch 136, or, usually, the blade 131 is adjusted to be spaced inwardly a little from the wall 31 so that it does not remove any distilland film remaining on the wall at this time, but allows the remaining film to pass through the notches or slots 139 in the wiper blade 133 which slots, however, are tilted so that the entire face of the wall 31 is wiped, without leaving any unwiped streaks as would be the case if the notches extended in a horizontal plane.

The liquid passing through the slots 139 is agitated to produce desirable turbulence therein, to promote heat transfer and to minimize undesired polymerization. In the usual arrangement, the slots slant downwardly from the leading edge to the trailing edge of the blade 133, so that they act as pumps greatly accelerating the downward motion of the film of distilland on the wall 31. If desired, however, the notches may slant upwardly so as to decelerate the flow of distilland and hold it on the wall 31 for a longer time.

That part of the distilland liquid which does not distill off the hot wall 31 during its downward travel over the surface of the wall, finally reaches the bottom, mingles with the excess distilland which comes down through the notch 136, and passes into the gutter 151. The vapors distilled off from the distilling surface 31 pass directly through short paths to the condenser tubes 161 or the fins thereon, are condensed by these cold condenser surfaces, and flow down to the bottom of the condenser and thence into the gutter 251 formed between the annular ring 153 and the annular ring 253 welded to the bottom 41 of the still, from which gutter the distillate product is removed through the conduit 255. Any vapors that pass around or through the condenser are drawn toward the diffusion vacuum pump at the center of the still, within the stack 221, but in order to get into the stack they must first pass downwardly below the bottom of the cylindrical flange 225 on the hood of the stack, and then upwardly in the narrow annular space between this hood 225 and the stack 221, with consequent great chance that they will come into contact with and be condensed by the cold coil 231 on the diffusion pump stack 221, to reduce the load on the diffusion pump that would otherwise be caused by uncondensed vapors passing into the inlet of the pump. Any vapors condensing on the cooling coil 231 or elsewhere on the outer surface of the diffusion pump flow downwardly into the space within the gutter flange 253 at the bottom of the still, and are removed through the conduit 257.

When undertaking distillation of the ordinary long-path kind, at higher pressures or lower vacuums than that used for molecular distillation, the removable baffle structure shown in Figs. 15–16 is preferably placed on the rotor, in spaces between the channels 111 which hold the wiper blades. These baffles, shown at 191 and 193, prevent straight path distillation, or straight passage of molecules from the heated distilling surface 31 to the condenser tube 161, and force the distilling vapors to take a circuitous path through the baffles 191 and 193, thereby serving to entrap any liquid phase molecules entrained with and carried along by the flow of vapor phase material.

The result of all this is a still of great efficiency and satisfactoriness, under varying conditions.

Referring now to the alternative construction shown in Fig. 18, there is here shown a still of what may be called tandem or two-decker form, similar in many respects to the still previously disclosed in connection with Figs. 1–16 except that it may be used at will either for short-path molecular distillation at high vacuum, or for long-path distillation at low vacuum or atmospheric pressure, without dismantling the still and adding or subtracting the baffle structure previously described. However, for maximum efficiency, it is nevertheless preferred to insert the baffles 191, 193 (Figs. 14–16) in the rotor of the two-story still (Fig. 18) when performing long path or non-molecular distillation therein, just as is done with the one-story still of Fig. 1.

The upper structure of the still, in this form shown in Fig. 18, is exactly the same as the still of Figs. 1–13, except that instead of resting upon the stationary bottom structure 41 and instead of having the diffusion pump extending upwardly into the center of the still, this upper structure in Fig. 18 rests upon a second upright still body 301 of approximately cylindrical shape, and of approximately the same height as the still body 31, which body 301 in turn rests upon the bottom structure 303, essentially the same as the previous bottom structure 41, containing the same diffusion pump parts 221—231, and containing the same gutters, outlets, etc., identified by the same numerals as in Fig. 1. A jacket 305 surrounds the lower still body 301 and in this instance is used as a cooler jacket supplied with refrigerant through the refrigerant inlet 307 and refrigerant outlet 309. The water jacket 53 protects the O-ring seal 49 from the injurious effects of heat conducted from the evaporating wall 31, just as before. No such protection is needed at the bottom of the lower still section 301, as there is no heat here.

Brackets 311 extending radially inwardly and obliquely upwardly from the walls 301 of the lower still body, serve to support the lower header 165 of the condenser tubes. The inlet 171a to carry the cooling fluid to the lower header 165 of the condenser, corresponding in general to the inlet 171 in Fig. 1, comes up through the bottom 303 of the lower body. The outlet conduit 173a from the upper header 163 corresponds in general to the outlet conduit 173 in Fig. 1, and goes down through the bottom 303. The same brackets 311 which serve to support the tubular condenser support also a frusto-conical gutter plate 315 which collects the distilland residue flowing from the bottom of the wall 31 of the upper still body, which residue is discharged through a conduit 317.

The upper part 31 of this still contains the same rotor, wiper blades, and associated parts as the still shown in Fig. 1.

In use, when high vacuum short-path molecular distillation is desired, the tubular condenser 161, 163, 165 is operated, and the vapors distilling off the evaporating surface 31 will condense on the tubular condenser, drop to the bottom of the apparatus into the gutter 251, and be removed through the product conduit 255, as before. When lower vacuum or long path distillation is desired, however, then the tubular condenser is not operated, but cooling fluid is introduced into the jacket 305 so that the cold condensing surface is formed by the wall 301 rather than by the tubular condenser. The distilled vapors then pass downwardly and are condensed on the wall 301, the product passing downwardly to the gutter 151 and being removed through the conduit 155. The advantage of this is that the cold surface 301 is removed a considerable distance from the hot evaporating surface 31, so that there is very little loss of heat by radiation from the hot surface to the cold surface, which heat loss is unavoidable when performing short path or molecular distillation because the two surfaces must be very close to each other.

Referring now to Fig. 17, there is shown a thermal circuit which, according to the present invention, may be used either with the single decker still of Fig. 1, or with the double decker or tandem still of Fig. 18. In this thermal circuit, the heating jacket 65 of the evaporating surface 31 is connected by means of a conduit 331, through an expansion valve 333, to the inlet conduit 171 (or 171a) of the inlet header 165 of the tubular condenser. The outlet conduit 173 (or 173a) from the outlet header 163 leads to the vapor compressor 335, which in turn is connected by the conduit 337 to the heating jacket 65. By using a suitable vapor-changing heat transfer fluid in this closed system, a continuous heat exchange is effected between the heating jacket and the tubular condenser, without requiring the use of cooling water such as is commonly used in a condenser. The heat transfer fluid as compressed by the compressor 335 (of any desired type, such as a centrifugal or a reciprocating compressor) is mainly in vapor phase, in which condition it is furnished under higher pressure to the heating jacket 65 of the still. This vapor phase fluid condenses on the walls of the jacket, and in condensing furnishes heat to the jacket, to keep the wall 31 at the necessary evaporating temperature. Then the liquid phase fluid passes to the so-called expansion valve 333, which lets the liquid phase through, with a considerable pressure drop, to a lower pressure area within the conduit 171 and the tubular condenser 161, 163, 165, wherein the heat transfer fluid boils and in boiling, takes up heat from the condenser tubes to cool them. The vapor boiled off of the heat transfer fluid then goes to the compressor 335 to repeat the cycle. In practice, a desuperheater and heat exchanger are incorporated in the circuit just beyond the compressor, to enable exact thermal balance of the system.

This construction constitutes a closed thermal circuit, requiring no addition of external heat nor of external cooling fluid. The system is kept in balance by the constant movement of vapor from the evaporating surface 31 to the tubular condenser 161, which flow of vapor carries heat from the evaporating surface to the condenser, while the flow of fluid in the closed thermal circuit serves constantly to carry heat back from the condenser to the evaporating surface. This arrangement is particularly useful where cooling water at the required temperature may be very scarce or even entirely unavailable, so that the condenser cannot be operated in the usual way by a flow of water through it.

In this closed thermal circuit, a variety of refrigerating fluids may be used. The choice is governed, according to known principles, by the conditions wanted in the condenser and in the evaporator. For low temperature distillation, it is satisfactory to use "Freon" such as used in domestic refrigerators. For distillation at higher temperature, silicone oils may be used, or preferably cuts of fluorocarbons may be used, these cuts being polymers of chlorotrifluoroethylene. The exact composition is determined by the temperatures used in taking the cuts out of a mixture of such polymers, and considerable variation is possible without departing from the invention.

Among the specific polymers which have been found satisfactory may be mentioned "Kel–F No. 10" as manufactured by M. W. Kellogg Company, and "Aroclor No. 1242" as manufactured by Monsanto Chemical Company.

In Fig. 19 there is illustrated a modified form of still or evaporator, together with another thermal circuit which is particularly useful where there is no reliable supply of cooling water substantially colder than the maximum temperature at which evaporation should be carried on.

In certain fields, as for example in the concentration of orange juice or grape juice, it is desirable to evaporate the water from the fruit juice at a temperature of not over about 75 degrees F., in order to avoid a change in flavor which may occur if higher temperatures are used. The condenser must obviously have a temperature substantially below the temperature of the evaporating wall. Yet it is really difficult to find a reliable supply of cooling water at substantially less than 75 degrees F., especially in localities like Florida and California where evaporation of orange juice is carried out on a large scale. In this case it is the residue distilland, after excess water is evaporated, which constitutes the desired product to be saved, while the distillate (the excess water evaporated out of the fruit juice) is to be discarded.

An arrangement for accomplishing this comprises a still body 31 with a heating jacket 65 the same as before, and with the same rotor and wiping blades as before. However, the tubular condenser and the vacuum pump of the diffusion type are omitted, and the bottom of the still is somewhat simplified as indicated at 351, so as to have a large central opening 353 which opens into the top of a steam ejector 355.

High pressure steam enters the ejector through the conduit 357 and passes through the usual expansion cone 359, the passage of the steam through this cone serving to create a partial vacuum to draw the water vapor evaporated from the fruit juice down through the bottom of the still through the opening 353. This water vapor then mixes with the steam fed into the ejector and passes up the discharge conduit 361 to the heating jacket 65, where the steam furnishes the required heat to keep the evaporated wall 31 at the desired temperature. The steam gives up its heat to the wall 31, is partially condensed thereby, and the mixture of steam and water leaves the jacket through the conduit 365 leading to the barometric condenser 367, in which the remaining steam vapor may be satisfactorily condensed even by cooling water of relatively high temperature (that is, 90 degrees F. or 100 degrees F.) as well understood by those familiar with barometric condensers. The barometric leg 369 carries off the mixture of condensing water and condensed steam, while maintaining the desired vacuum. It is preferable to connect a steam ejector 371 to the barometric condenser 367, to assist in creating and maintaining the desired vacuum in the barometric condenser and to draw off any vapor not condensed and discharged by the barometric condenser.

The fruit juice, fed in at the top of the rotor, thus loses a substantial part of its water as it travels down the hot evaporating wall 31, and the concentrated juice collects in the gutter 371 formed by the ring-shaped flange 373 in the bottom 351, and is withdrawn through the discharge conduit 375.

As examples, it may be said that the steam may enter the ejector 355 at a pressure of about 100 pounds per square inch, and in a properly designed ejector of known construction the passage of the steam through the ejector will draw a vacuum within the still to a pressure of about 20 millimeters of mercury. The action of the ejector boosts the pressure up, for example, from about 20 millimeters of mercury to about 150 millimeters of mercury, at which pressure the steam is fed through the conduit 361 and into the evaporating jacket 65. These figures are given merely as a typical example, and of course are subject to wide variation.

In all of these forms of the invention, whether the still is an ordinary single still or a double decker or tandem still, and whether it is used to produce a valuable distillate or whether it is employed merely to evaporate excess water from the distilland, and whether it is used for short path molecular distillation at high vacuum or for long path distillation at lower vacuum, the rotor with the scraper blades of the present invention is found to be particularly desirable and useful in keeping the still walls (evaporating surface walls) in a clean condition, preventing "burned" spots and preventing undesirable accumulation of polymers and sludge, and insuring even distribution of a thin film of the desired thickness.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. In apparatus for processing liquid in a film: a body having a chamber that is formed with an internal surface of revolution having an upright axis, means for supplying liquid to said surface to flow downwardly thereover in a film under the influence of gravity, a rotor mounted in said chamber for rotation about an axis that is disposed within said surface, said rotor being formed with guide means, a vertically arranged series of wiper blades that are mounted on said rotor for rotation upon rotation of said rotor and that are disposed in superposed relation relative to each other, each said blade having an axial length less than the axial length of said surface and being free to move radially independently of said other blades, each said blade being formed with one edge portion comprising alternating lands and recesses and having a face on said edge constituted of land faces all lying substantially in a single generated surface, each said blade being mounted with said edge face disposed to confront said surface, and each said blade being mounted for radial movement relative to said surface along a radially-extending path that is defined by said guide means, whereby said blade constantly presents said edge face to said surface for engagement with said surface upon radial movement of said blade under centrifugal force upon rotation of said rotor, said lands and said recesses having substantial angular extent relative to said surface of revolution to provide respectively broad bearing surfaces to cooperate with said guide means to maintain the orientation of said blade and to provide elongate passages between adjacent lands, said lands being formed to engage said surface along lines of contact at their respective leading edges, with respect to the direction of rotation relative to said surface, that are inclined axially of said surface, thereby to remove the liquid from said surface upon rotation of said rotor and to direct the removed liquid into said recess passages to mix it therein and to impart to the removed liquid a motion having a component axially of said surface, and to return the removed liquid to said surface possessed of a velocity having a component axially of said surface, again to form a film to flow downwardly thereover under the influence of gravity, thereby to maintain the liquid in an agitated, turbulent state on said surface, and to permit control, by adjustment of the speed of rotation of said blades and the angular inclination of the leading edges of said lands, over the transit time of the liquid over said surface.

2. Apparatus in accordance with claim 1, in which said means for supplying liquid to said surface comprises a plate that is mounted in said chamber for rotation about an axis that is disposed within said surface, said plate having an upper surface, a generally cylindrical upstanding member secured on the upper surface of said plate, means for supplying feed liquid that is to be processed onto the upper surface of said plate in sufficient radially inwardly spaced relation to said upstanding member, to provide an area of said plate surface of substantial radial extent to permit the formation of a film of the feed liquid on said area during traversal thereof under centrifugal force upon rotation of said plate, whereby upon rotation of said plate said feed liquid is spread over said area in a film and is caused to flow toward said upstanding member to accumulate at said member, and conduit means disposed in said member and mounted to rotate upon rotation of said plate and disposed to receive liquid from the accumulation at said member and to dispense it upon rotation of said plate under centrifugal force to said surface of revolution.

3. Apparatus in accordance with claim 1, in which said leading edges of said lands respectively are downwardly and rearwardly inclined relative to said surface of revolution and to the direction of rotation of said rotor, to impart to the removed liquid in said recess passages a motion having a downward component axially of said surface of revolution.

4. The apparatus of claim 1 in which said lands have leading edges of sufficient axial extent to provide lines of contact that engage and wipe the entire area of said surface of revolution between the upper and lower ends of said superposed wiper blades, during each complete rotation of said rotor.

5. Apparatus for the distillation of liquid from a film, comprising a body having a chamber, said chamber being formed with an internal surface of revolution having an upright axis, means for supplying liquid to said surface to flow downwardly thereover in a film under the influence of gravity, means for heating said surface to heat the liquid on said surface, a condenser disposed in said chamber, a rotor mounted in said chamber for rotation about an axis that is disposed within said surface, a plurality of guide members mounted on said rotor intermediate said condenser and said surface for movement as a unit relative to said surface upon rotation of said rotor, said guide members being disposed in angularly spaced relation to each other, a series of generally block-shaped wiper blades mounted on said rotor intermediate said condenser and said surface, each series of wiper blades comprising a plurality of blades that are mounted one above the other, each said blade being substantially rigid and having an axial length less than the axial length of said surface and being free to move radially independently of other blades but in operative association with a guide member, each said blade being formed with one edge portion comprising alternating lands and recesses and having a face on said edge constituted of land faces all lying substantially in a single generated surface, each said blade being mounted with said edge face disposed to confront said surface, and each said blade being mounted for radial movement relative to said surface along a radially-extending path that is defined by its associated guide member, whereby said blade is held at an orientation constantly to present said edge face to said surface for engagement with said surface upon radial movement of said blade under centrifugal force upon rotation of said rotor, the lands and recesses of each blade having substantial angular extent relative to said surface of revolution to provide respectively broad bearing surfaces to cooperate with the associated guide member to maintain the orientation of said blade and to provide elongate passages between adjacent lands, said lands being formed to engage said surface along lines of contact at their respective leading edges, with respect to the direction of movement relative to said surface, that are inclined axially of said surface, thereby to remove the liquid from said surface upon rotation of said rotor and to direct the removed liquid into said recess passages to mix it therein to change its velocity in an axial direction relative to said surface of revolution and to return it therefrom to said surface at an axially displaced portion of said surface relative to the portion of said surface from which it was removed, again to form a film to flow downwardly thereover under the influence of gravity, thereby to maintain the liquid in an agitated, turbulent state on said surface, and to permit control, by adjustment of the speed of rotation of said rotor and of the angular inclination of the leading edges of said lands, over the transit time of the liquid over said surface.

6. Apparatus for the distillation of liquid from a film comprising a body having a chamber that is adapted to be evacuated and that is formed with an internal cylindrical surface having an upright axis, means for supplying liquid to said surface to flow downwardly thereover in a film under the influence of gravity, means for supplying heat to said surface to heat the liquid in said film, a generally cylindrical condenser mounted in said chamber substantially coaxially with said cylindrical surface, a rotor mounted for rotation about an upright axis that is generally coaxial with the axis of said cylindrical surface, said rotor including a plurality of channel members that are secured to said rotor in angularly spaced relation to each other intermediate said condenser and said surface and that are disposed for movement as a unit relative to said surface upon rotation of said rotor and with the channels thereof confronting said surface, said channel members having axially-extending parallel sidewalls, a series of generally block-shaped wiper blades mounted one above the other in each of said channels respectively, each of said blades being substantially rigid and having an axial length less than the axial length of said surface and being free to move radially independently of other blades, the blades in each series being disposed with their sides engaging the side walls of the respective channel member in which they are seated in sliding relation, each of said blades being formed with one edge portion comprising alternating lands and recesses and having a face on said edge constituted of land faces all lying substantially in a single generated surface, each said blade being mounted with said edge face disposed to confront said surface, and each of said blades having sides thereof of substantial radial extent disposed in sliding engagement with the side walls of the respective channel member for radial movement relative to said surface of revolution along a radially-extending path that is defined by the sides of the associated respective channel member, whereby each of said blades is held at an orientation constantly to present said edge face to said surface of revolution for engagement with said surface upon radial movement of said blade under centrifugal force upon rotation of said rotor, the lands and recesses of each blade having substantial angular extent relative to said surface of revolution to provide respectively broad bearing surfaces to cooperate with the sides of the associated respective channel member to maintain the orientation of said blade and to provide elongate passages between adjacent lands, said lands being formed to engage said surface along lines of contact at their respective leading edges, with respect to the direction of movement relative to said surface, that are inclined axially of said surface, thereby to remove the liquid from said surface upon rotation of said rotor and to direct the removed liquid into said recess passages to mix it therein to change its velocity in an axial direction relative to said surface of revolution and to return it therefrom to said surface at an axially displaced portion of said surface relative to the portion of said surface from which it was removed, again to form a film to flow downwardly thereover under the influence of gravity, thereby to maintain the liquid in an agitated, turbulent state on said surface and to permit control, by angular inclination of the leading edges of said lands, over the transit time of the liquid over said surface.

7. Apparatus in accordance with claim 6 for the distillation of liquid under reduced pressure, including means for maintaining said chamber under vacuum including a diffusion pump having an inlet that is disposed in said chamber for withdrawing vapor therefrom and including a generally cylindrical casing, at least a part of which is disposed in said chamber to project upwardly into said chamber within the bore of said condenser, and means within said chamber for cooling said casing.

8. A continuous method for processing liquid in a thin, agitated, turbulent film while controlling the hold-up time of the liquid in film form, comprising applying said liquid to a portion of an internal upright surface of revolution of a body to form a film to flow downwardly thereover under the influence of gravity, and then subjecting the liquid to repeated cycles each comprising the steps of removing the liquid film, agitating the removed liquid and mechanically accelerating it axially of said surface, and then returning it to said surface again to form a film, by steps including wiping said surface continuously over axially extending areas thereof with a plurality of axially overlapped wiping edges of the radially projecting lands of a plurality of superposed separate substantially rigid wiper blades that are free to move radially independently of each other and whose projecting lands are separated from each other by recesses wherein both said lands and said recesses have substantial angular extent relative to said surface of revolution, and which wiping edges are inclined axially of said surface, to remove the liquid from said surface, collecting the removed liquid in said recesses and mixing it therein, mechanically impelling the removed liquid while in each recess axially over said surface thereby changing its velocity while in said recesses in an axial direction relative to said surface, and discharging the mixed, removed liquid back to said surface with a velocity having a component in a direction axially of said surface, again to form a film to flow downwardly over said surface under the influence of gravity.

9. A method in accordance with claim 8 comprising as to the step of mechanically impelling the removed liquid axially over said surface the specific step of mechancally impelling the removed liquid axially downward over said surface thereby increasing its velocity over said surface.

10. A continuous method for distilling liquid from a film comprising applying said liquid to a portion of an internal upright surface of revolution of a body to form a film to flow downwardly thereover under the influence of gravity, and then subjecting the liquid to repeated cycles each comprising the steps of applying heat to said surface of reovlution to heat the liquid to vaporize at least a portion thereof, removing the liquid film, agitating the removed liquid and mechanically accelerating it axially, and then returning it to the surface again to form a film, and condensing and recovering vaporized material, by steps including applying heat to said surface for transmission to the liquid in said film, wiping said surface continuously over axially-extending areas thereof with a plurality of axially overlapped wiping edges of the radially projecting lands of a plurality of superposed separate substantially rigid wiper blades that are free to move radially independently of each other and whose projecting lands are separated from each other by recesses wherein both said lands and said recesses have substantial angular extent relative to said surface of revolution, and which wiping edges are inclined axially of said surface, to remove the liquid film from said surface, collecting the removed liquid in said recesses and mixing it therein, mechanically impelling the removed liquid while in each recess axially over said surface thereby changing its velocity in an axial direction relative to said surface, and discharging the mixed, removed liquid back to said surface with a velocity having a component in a direction axially of said surface, again to form a film to flow downwardly over said surface under the influence of gravity.

11. A continuous method for distilling liquid from a thin, agitated, turbulent film under reduced pressure while controlling the holdup time of the liquid in film form, comprising applying said liquid to the upper surface of a rapidly rotating plate at a radially inner location thereon under reduced pressure and permitting the liquid to flow radially outwardly under centrifugal force in a thin film on the surface of said plate to permit degassing from said film, collecting the degassed liquid and applying it from angularly spaced locations to a portion of an internal upright cylindrical surface of a body, under reduced pressure, to form a film to flow downwardly thereover under the influence of gravity, supplying heat to said surface for transmission to the liquid to vaporize at least a part of the liquid, condensing the vapor that is formed, recovering the condensate, and subjecting the liquid to repeated cycles of treatment while traversing said surface each comprising the steps of removing the liquid film, agitating the removed liquid and mechanically accelerating it downwardly over said surface, and then returning it to the surface again to form a film, by steps including wiping said surface continuously over axially extending areas thereof with a plurality of axially overlapped wiping edges of the radially projecting lands of a plurality of superposed separate substantially rigid wiper blades that are free to move radially independently of each other and whose projecting lands are separated from each other by recesses wherein both said lands and said recesses have substantial angular extent relative to said surface, and which wiping edges are inclined downwardly relative to said surface to remove the liquid film from said surface, collecting the removed liquid in said recesses and mixing it therein, mechanically impelling the removed liquid while in each recess downwardly over said surface by action of said lands thereon, thereby changing its velocity while in said recesses to increase its downward velocity over said surface, and discharging the mixed, removed liquid back to said surface with a downward velocity over said surface, again to form a film to flow downwardly over said surface under the influence of gravity, for further heating in film form on said surface.

References Cited in the file of this patent

UNITED STATES PATENTS

| | | |
|---|---|---|
| 549,001 | Mellon | Oct. 29, 1895 |
| 1,406,055 | Merrel | Feb. 7, 1922 |
| 2,032,785 | Zorn et al. | Mar. 3, 1936 |
| 2,076,597 | Robinson et al. | Apr. 13, 1937 |
| 2,180,052 | Hickman et al. | Nov. 14, 1939 |
| 2,202,008 | Ittner | May 28, 1940 |
| 2,306,265 | Heald | Dec. 22, 1942 |
| 2,403,978 | Hickman et al. | July 16, 1946 |
| 2,437,594 | Denys | Mar. 9, 1948 |
| 2,484,445 | Bibby | Oct. 11, 1949 |
| 2,493,220 | Bibby | Jan. 3, 1950 |
| 2,500,900 | Madlen | Mar. 14, 1950 |
| 2,539,699 | Perry et al. | Jan. 30, 1951 |
| 2,546,381 | Zahm | Mar. 27, 1951 |
| 2,615,706 | Davey | Oct. 28, 1952 |
| 2,694,675 | Hogan | Nov. 16, 1954 |
| 2,695,871 | Shavel et al. | Nov. 30, 1954 |
| 2,766,193 | Schneider | Oct. 9, 1956 |
| 2,793,174 | Smith | May 21, 1957 |
| 2,848,388 | Bueche | Aug. 19, 1958 |
| 2,897,146 | Waddill | July 28, 1959 |

FOREIGN PATENTS

| | | |
|---|---|---|
| 11,167 | Netherlands | Mar. 15, 1924 |
| 330,805 | Great Britain | June 19, 1930 |
| 719,563 | Great Britain | Dec. 1, 1954 |

OTHER REFERENCES

"Remote Condenser Falling—Film High Vacuum Still," "Industrial and Engineering Chemistry," vol. 42, September 1950, pages 1930–34.

Majonnier pamphlet, Bulletin 300–1053–5M, 1955.